United States Patent
Yeh et al.

(10) Patent No.: US 9,171,311 B2
(45) Date of Patent: Oct. 27, 2015

(54) MAINTAINING TARGETABLE USER INVENTORY FOR DIGITAL ADVERTISING

(75) Inventors: Ehr-Chun Yeh, New Castle, WA (US); Sijian Zhang, Bellevue, WA (US); Shaoyu Zhou, Issaquah, WA (US); Lei Jin, Issaquah, WA (US); Fei Cao, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 722 days.

(21) Appl. No.: 12/872,950

(22) Filed: Aug. 31, 2010

(65) Prior Publication Data

US 2012/0054003 A1    Mar. 1, 2012

(51) Int. Cl.
G06Q 30/00    (2012.01)
G06Q 30/02    (2012.01)

(52) U.S. Cl.
CPC ............ *G06Q 30/02* (2013.01); *G06Q 30/0241* (2013.01); *G06Q 30/0255* (2013.01); *G06Q 30/0269* (2013.01); *G06Q 30/0251* (2013.01)

(58) Field of Classification Search
CPC ............ G06Q 30/0241–30/0277; G06Q 12/08
USPC ........................ 705/14.4–14.73; 711/118–146
See application file for complete search history.

(56) References Cited

U.S. PATENT DOCUMENTS

| | | | |
|---|---|---|---|
| 6,012,057 A * | 1/2000 | Mayer et al. ........................... 1/1 |
| 6,112,186 A * | 8/2000 | Bergh et al. .................. 705/7.32 |
| 6,487,641 B1 * | 11/2002 | Cusson et al. ................. 711/144 |
| 7,257,546 B2 * | 8/2007 | Ebrahimi et al. ........... 705/14.73 |
| 7,509,407 B2 * | 3/2009 | Miller et al. ................... 709/223 |
| 7,606,897 B2 * | 10/2009 | Izrailevsky et al. ........... 709/224 |
| 7,756,859 B2 * | 7/2010 | Simonyi ......................... 707/718 |
| 7,853,474 B2 * | 12/2010 | Ullah ............................ 705/7.31 |
| 8,224,809 B2 * | 7/2012 | Carlsson et al. .............. 707/715 |
| 2002/0178447 A1 | 11/2002 | Plotnick et al. |
| 2003/0065595 A1 * | 4/2003 | Anglum .......................... 705/35 |
| 2005/0131762 A1 * | 6/2005 | Bharat et al. ..................... 705/14 |
| 2006/0143079 A1 * | 6/2006 | Basak et al. ..................... 705/14 |
| 2007/0220103 A1 * | 9/2007 | Rogers et al. .................. 709/217 |
| 2007/0239530 A1 | 10/2007 | Datar |
| 2007/0239535 A1 * | 10/2007 | Koran et al. ..................... 705/14 |
| 2007/0260596 A1 | 11/2007 | Koran et al. |
| 2007/0261114 A1 * | 11/2007 | Pomerantsev .................. 726/12 |
| 2009/0063471 A1 * | 3/2009 | Erickson ........................... 707/5 |

(Continued)

OTHER PUBLICATIONS

How much can Behavioral Targeting Help Online Advertising?—Published Date: 2009 http://www2009.eprints.org/27/1/p261.pdf.

(Continued)

*Primary Examiner* — Bennett Sigmond
(74) *Attorney, Agent, or Firm* — Joann Dewey; Jim Ross; Micky Minhas (57) ABSTRACT

Systems, methods, and computer storage media having computer-executable instructions embodied thereon that maintain a targetable user inventory for digital advertising. In embodiments, a request is made for user data associated with a user identification. If the user data or user identification is not available, a list of alternative user identifications is ranked according to various criteria based on identification signals. A match is selected from the list of alternative user identifications and user data associated with the alternative user identification is communicated in response to the request.

21 Claims, 6 Drawing Sheets

(56) References Cited

U.S. PATENT DOCUMENTS

| | | |
|---|---|---|
| 2009/0125585 A1 | 5/2009 | Krishnaswamy et al. |
| 2009/0216607 A1 | 8/2009 | Bartholomew |
| 2009/0300009 A1 | 12/2009 | Rezaei et al. |
| 2009/0327075 A1* | 12/2009 | Saadat et al. ............... 705/14.53 |
| 2009/0327076 A1 | 12/2009 | Sinyagin et al. |
| 2010/0082527 A1* | 4/2010 | Jain ............................... 707/603 |
| 2010/0205213 A1* | 8/2010 | Broder et al. ................. 707/780 |
| 2010/0228631 A1* | 9/2010 | Zhang et al. ............... 705/14.66 |

OTHER PUBLICATIONS

Finding Advertising Keywords on Web Pages—Published Date: 2006 http://www.cs.cmu.edu/~vitor/papers/www06.pdf.

\* cited by examiner

MAINTAINING TARGETABLE USER INVENTORY FOR DIGITAL ADVERTISING

BACKGROUND

In the display advertising business, behavioral targeting (BT) is a popular method for building relationships with a target audience. Interest in utilizing BT in digital advertising businesses has been growing as advertisers are under constant pressure to achieve higher return on investments (ROI). Unfortunately, BT requires the ability to identify users within a network. Because of computer memory limitations, only a limited amount of user data is typically stored in the computer memory for fast retrieval. To deal with the resulting cache miss issues, many advertisers search secondary media (such as a data file on a hard disk) to find the missing user ID's data. However, as internet users become more diligent in refreshing cookies, the primary mechanism utilized by web sites to identify users, digital advertisers have struggled to maintain a targetable user inventory. Exacerbating the problem further, any time a user updates the browser or simply changes the language setting, the cookies are lost. As a result, after a one month period, it is approximated that nearly fifty percent of a targetable user inventory, utilizing cookies alone, is no longer available, making BT largely ineffective for digital advertising. Accordingly, maintaining a targetable user inventory so BT may be utilized in digital advertising is needed.

SUMMARY

Embodiments of the present invention relate to systems, methods, and computer-readable media for, among other things, maintaining targetable user inventories for digital advertising. In this regard, embodiments of the present invention utilize a user identification mapping service to identify users whose user identification and corresponding user data is no longer available in an in-cache memory. The user identification mapping services returns alternative identifications that are sorted and associated with the missing user identification. Data associated with the alternative user identifications is provided in response to an advertising call, such that BT is available even in instances when the user is not initially identifiable. As used herein, alternative user identifications describe both other user identifications previously utilized by a user as well as user identifications selected as a match based on shared identification signals, described in detail below.

Accordingly, in one aspect, the present invention is directed to one or more computer storage media having computer-executable instructions embodied thereon, that when executed, cause a computing device to perform a method for maintaining a targetable user inventory for digital advertising. The method includes receiving a request for data associated with a user identification and determining that user identification and corresponding is not available. The method further includes requesting from a user identification mapping service a list of alternative identifications corresponding to the user identification. The method further includes sorting the list of alternative identifications to identify a match and associating the data of a match with the user identification.

In yet another aspect, the present invention is directed to a system for maintaining a user inventory for digital advertising. The system includes one or more processors and one or more computer-readable storage media, a behavior targeting component, an in-cache memory, a user identification mapping store component, and a cache miss handling component. The behavior targeting component receives identification signals associated with a user identification. Further, an in-cache memory returns available user data. The user identification mapping store stores user data, including the identification signals. The cache miss handling component communicates with the user identification mapping store to identify alternative user identifications associated with the identification signals.

In another aspect, the present invention is directed to a method for maintaining a user inventory for digital advertising. The method includes receiving an advertising call for a user identification. The method further includes searching for the user identification in an in-cache memory. If it is determined the user identification is not available in the in-cache memory, a request is made to the user identification mapping store for alternative user identifications. The method further includes sorting the alternative user identifications and associating a match selected from the sorted alternative user identifications with the user identification.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer storage media having computer-executable instructions embodied thereon that maintain targetable user inventories for digital advertising. In this regard, embodiments of the present invention provide advertisers with useful, and persistent, data related to users of various websites. Accordingly, an advertiser is able to maintain data specific to a user and provide advertisements targeted to preferences of the user as indicated by previous interactions with the user.

Having briefly described an overview of the present invention, an exemplary operating environment in which various aspects of the present invention may be implemented is described below in order to provide a general context for various aspects of the present invention. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 1:
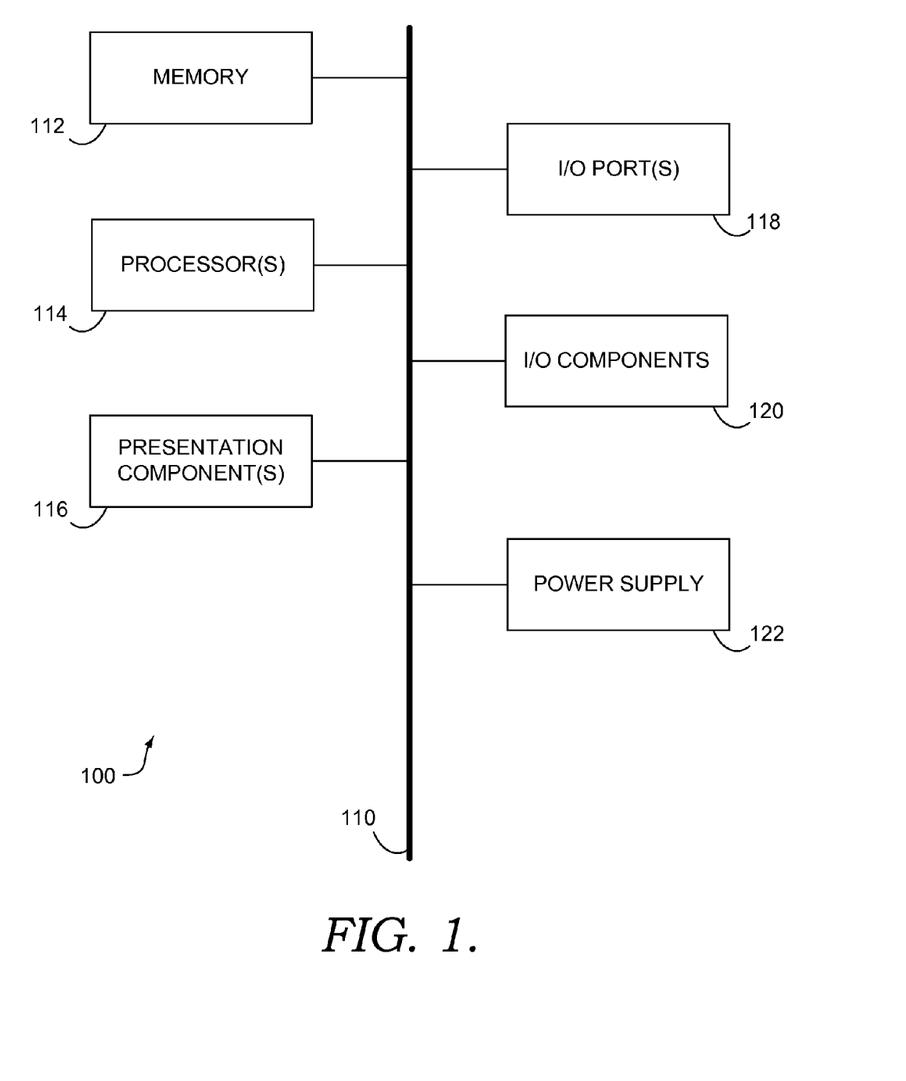
FIG. 1 is a block diagram of an exemplary computing environment suitable for use in implementing embodiments of the present invention.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
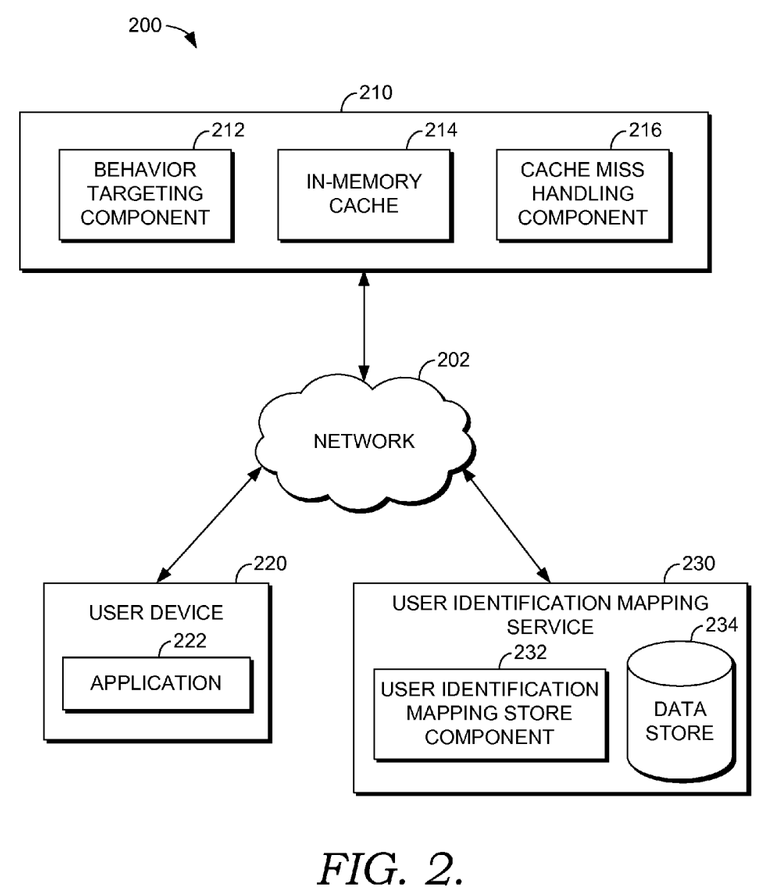
FIG. 2 is a block diagram of an exemplary computing system architecture suitable for use in implementing embodiments of the present invention.

With reference to FIG. 2, a block diagram is illustrated that shows an exemplary computing system architecture 200 configured for use in implementing embodiments of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components illustrated therein.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The in-cache memory 214 is configured to store user identifications and information associated with user identifications. In various embodiments, such information comprises user data and identification signals. User data, as used herein, refers to any data in association with a user of a website and/or a device being used by the user to access the website. User data includes, for example, user profile data, device data, related data, global data, and/or the like. User profile data is any data or indicator in association with a user including, for example, habitual or routine behaviors of the user and/or indicators associated with events, activities, or behaviors of the user. User profile data may include, by way of example only, routine search behaviors of the user, searches or queries previously provided by the user, links to uniform resource locators (URLs) frequented by the user, and/or the like. As such, user profile data might be data that is identified or captured in association with user interaction of the web browser, the client, and/or the computing device of the user. User profile data may also include user information input and/or modified directly by the user (e.g., user interests, birthday, etc.). In some embodiments, user profile data can be captured or identified in association with a user identifier (e.g., a user identifier used by the user to log in) or a user device. The identification signals may include, without limitation, internet protocol address, browser types, browser versions, cookies, and/or the like. In embodiments, the in-cache memory 214 is configured to provide, in response to an advertising call, one or more of the items stored in association therewith.

It will be understood and appreciated by those of ordinary skill in the art that the information stored in association with the in-cache memory 214 may be configurable and may include any information relevant to BT. As such, the information enables a customized advertising experience for the user, including advertisements tailored to information associated with the user identification. The content and volume of such information are not intended to limit the scope of embodiments of the present invention in any way.

Each of the user data service 210, user device 220, and the user identification mapping service 230 shown in FIG. 2 may be any type of computing device, such as, for example, computing device 100 described above with reference to FIG. 1. By way of example only and not limitation, each of the user data service 210, user device 220, and the user identification mapping service 230 may be a personal computer, desktop computer, laptop computer, handheld device, mobile handset, consumer electronic device, server, or the like. It should be noted, however, that embodiments are not limited to implementation on such computing devices, but may be implemented on any of a variety of different types of computing devices within the scope of embodiments hereof.

Components of the user data service 210, user device 220, and the user identification mapping service 230 may include, without limitation, a processing unit, internal system memory, and a suitable system bus for coupling various system components, including one or more databases for storing information (e.g., files and metadata associated therewith). Each of the user data service 210, user device 220, and the user identification mapping service 230 typically includes, or has access to, a variety of computer-readable media.

It will be understood by those of ordinary skill in the art that computing system architecture 200 is merely exemplary. While the user data service 210 is illustrated as a single unit, one skilled in the art will appreciate that the user data service 210 is scalable. For example, the user data service 210 may in actuality include a plurality of computing devices in communication with one another. Moreover, the user identification mapping service 230, or portions thereof, may be included within the user data service 210 (not shown). In another embodiment, the user identification mapping service is connected to the user data service is connected to the user data service by a local area network. The single unit depictions are meant for clarity, not to limit the scope of embodiments in any form.

The user device 220 shown in FIG. 2 is a personal computing device. It will be understood by those of ordinary skill in the art that the user device 220 is merely exemplary and that the user device 220 may be any type of computing and/or communication device, such as a personal computer, mobile device, or the like. The computing device 220 includes an application 222, such as an internet browser.

As shown in FIG. 2, the user data service 210 includes, among other components, a behavior targeting component 212, an in-cache memory 214, and a cache miss handling component 216. The behavior targeting component is configured to receive a request for user data associated with a user identification. Such a request may be made, in one embodiment, in the form of an advertising call. In response to a user visiting a particular website, the website may make an advertising call to the behavior targeting component seeking data associated with the user identification for that user to customize the advertisements displayed to the user. The behavior targeting component receives the advertising call and searches the in-cache memory to find the user data associated with the user identification. If such information is not available or the user identification is no longer present in the in-cache memory, the behavior targeting component requests that the cache miss handling component 216 communicate with the user identification mapping service 230 to identify alternative user identifications that the user might have used. In one embodiment, a throttling feature allows an administrator to determine how often the cache miss handling component is utilized according to a desired system performance. The cache miss handling component provides available user identification signals to the user identification mapping service. Such signals may include internet protocol address, browser type, browser version, cookies, and/or other available information.

The user identification mapping store component 232 compares the available user identification signals to identification signals associated with alternative user identifications contained in a data store 234. A list of alternative user identifications is assembled with at least one identification signal in common with the identification signals of the user identification and sorted by the user identification mapping store component. In one embodiment, the list is sorted according to most recent access. In another embodiment, the list is sorted according to a confidence weight. The confidence weight, in one embodiment, is determined based on a statistical likelihood that the alternative user identification is the same user associated with the user identification. The list is then returned to the cache miss handling component and an alternative user identification, or a match, is selected. The match is then associated with the user identification and user data associated with the match is transitioned to the user identification and communicated in response to the advertising call. In one embodiment, a new user identification is created for the data transition. In another embodiment, the original user identification is utilized for the data transition. In yet another embodiment, the alternative user identification is utilized and any available information is transitioned from the original user identification to the alternative user identification.

Figure 3:
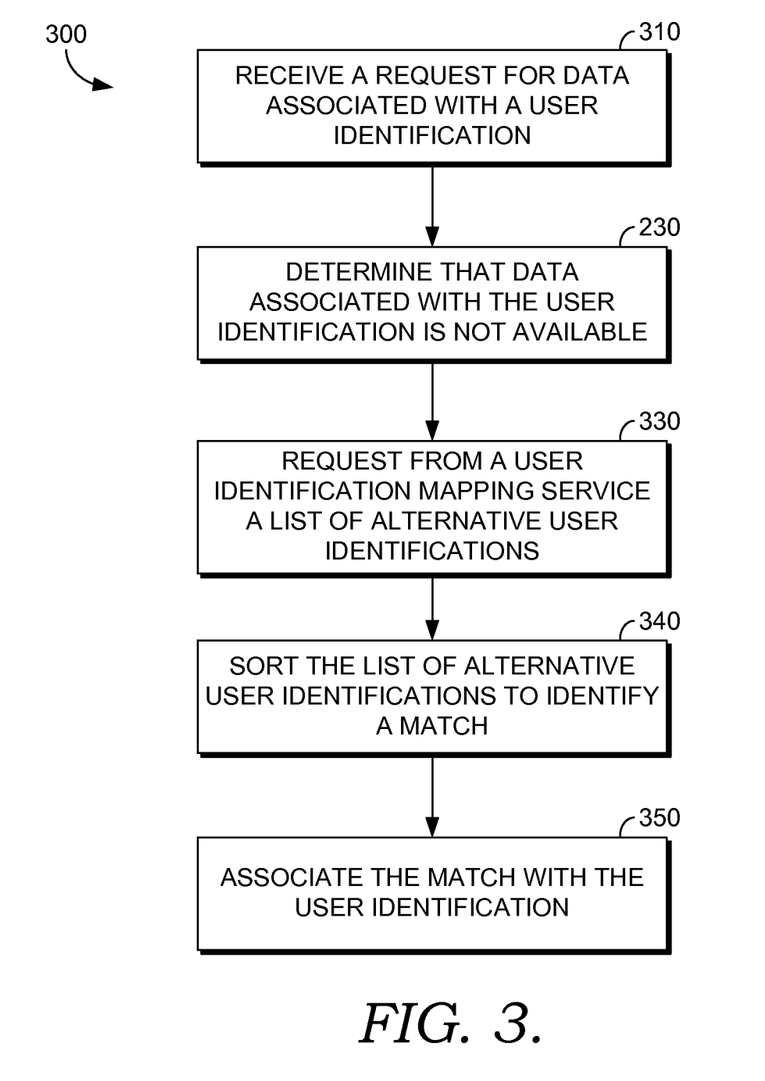
FIG. 3 is a flow diagram showing a method for associating a match with a user, in accordance with an embodiment of the present invention.

Referring now to FIG. 3, assume that a user visits a website. A plurality of identification signals is received and associated with the user identification (not shown). The identification signals are stored, among other locations, in a user identification mapping store (not shown). The identification signals comprise, in various embodiments, at least one of an internet protocol address, a browser type, a browser version, cookies, and any other user identifiable signals received from a web request. In order to tailor the advertisements displayed for a particular user, a request is received for user data associated with the user identification as illustrated at 310. If it is determined that user data associated with that particular user identification is not available (as illustrated at 320) or the user identification is no longer present, a list of alternative identifications is requested from a user identification mapping service as illustrated at 330. The list of alternative identifications is sorted to identify a match to the user identification as illustrated at 340. In one embodiment, the list is sorted according to most recent access. In another embodiment, the list is sorted according to a confidence factor. The confidence factor, in one embodiment, comprises a statistical ranking, based on information shared by the user identification and alternative identifications. For example, one alternative identification may share a common browser type and browser version (i.e. 2 similarities) with the user identification. Another alternative identification may share an internet protocol address, a browser type, and a browser version (i.e. 3 similarities). In this embodiment, the alternative identification with 3 similarities is ranked higher than the alternative identification with 2 similarities and is determined to be a match. The match and any available information, including user data and identification signals, is then associated with the user identification as illustrated at 350. The advertiser may then utilize the corresponding data to personalize the advertising experience for the user.

Figure 4:
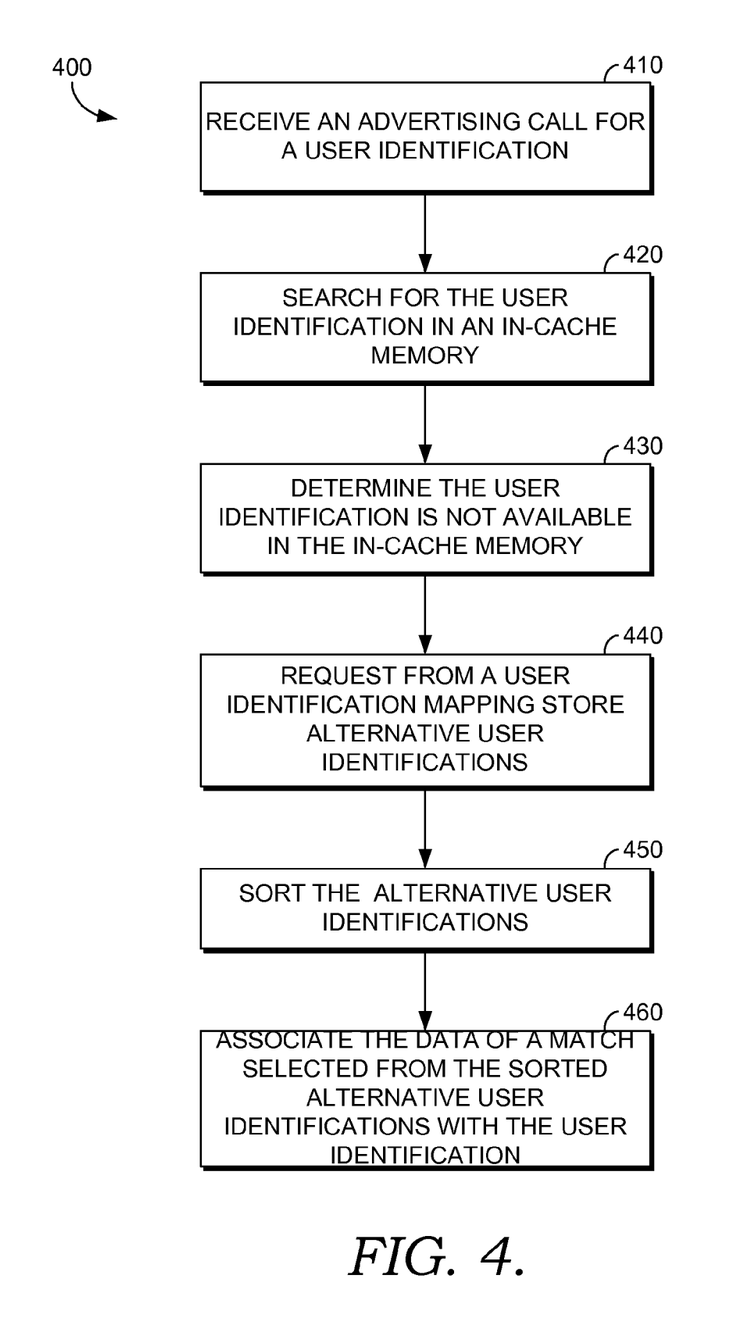
FIG. 4 is a flow diagram showing a method for associating an assumed user identification with a user identification, in accordance with an embodiment of the present invention.

Similarly, as shown in FIG. 4, an advertising call is received for a user identification as illustrated at 410. The advertising call seeks information associated with the user identification. The in-cache memory is searched as illustrated at 420. If it is determined that the user identification is not available in the in-cache memory as illustrated at 430, a list of alternative user identifications are requested from a user identification mapping store as illustrated at 440. Identification signals associated with the user identification are provided to the user identification mapping store. The user identification mapping store compares the identification signals to identification signals associated with alternative user identifications stored in the user identification mapping store. The alternative user identifications are sorted as illustrated at 450. In one embodiment, the list is sorted according to most recent access. In another embodiment, the list is sorted according to a confidence factor. The confidence factor, in one embodiment, comprises a statistical ranking, based on information shared by the user identification and alternative identifications. For example, one alternative identification may share a common browser type and browser version (i.e. 2 similarities) with the user identification. Another alternative identification may share an internet protocol address, a browser type, and a browser version (i.e. 3 similarities). In this embodiment, the alternative identification with 3 similarities is ranked higher than the alternative identification with 2 similarities and is determined to be a match. A match is then selected from the sorted alternative user identifications and the match is associated with the user identification as illustrated at 460. Any data associated with the match is transitioned to the user identification, in one embodiment. In another embodiment, the data is transitioned to a new user identification.

Figure 5:
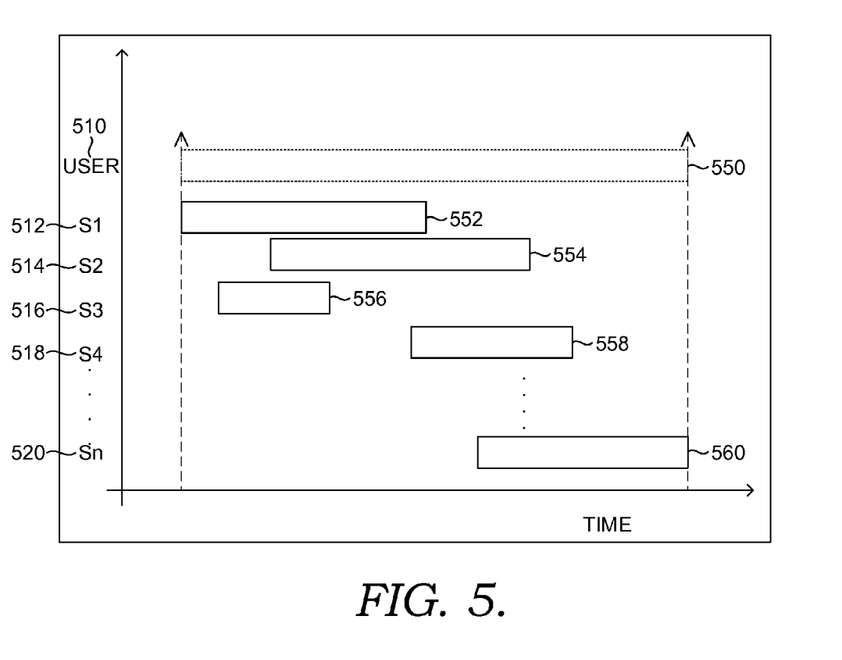
FIG. 5 is an illustrative diagram showing overlapping identification signals for alternative user identifications with the user identification, in accordance with an embodiment of the present invention.

Turning now to FIG. 5, an exemplary diagram illustrating how various identification signals corresponding to multiple user identifications are utilized in embodiments of the present invention to identify a match. A user identification, User 510, is comprised of identification signals 550. Alternative users, S1 512, S2, 514, S3 516, S4, 518, and Sn 520, are comprised of identifications signals 552, 554, 556, 558, and 560 respectively. As evident in the diagram, each alternative user comprises identification signals with varying degrees of overlap with the identification signals of User 510. The alternative users are sorted according to the desired criteria and a match is selected. For example, the highest degree of overlap may be desirable, in one embodiment. In another embodiment, equal degrees of overlap may exist. In this instance, one identification signal may be given higher priority than another identification signal. In yet another embodiment, the most recent alternative user with any matching identification signal may be selected. It is presumed that the selected match corresponds to the user identification and any information associated with the match is transitioned to the user identification, in one embodiment, or to a new user identification in another embodiment.

Figure 6:
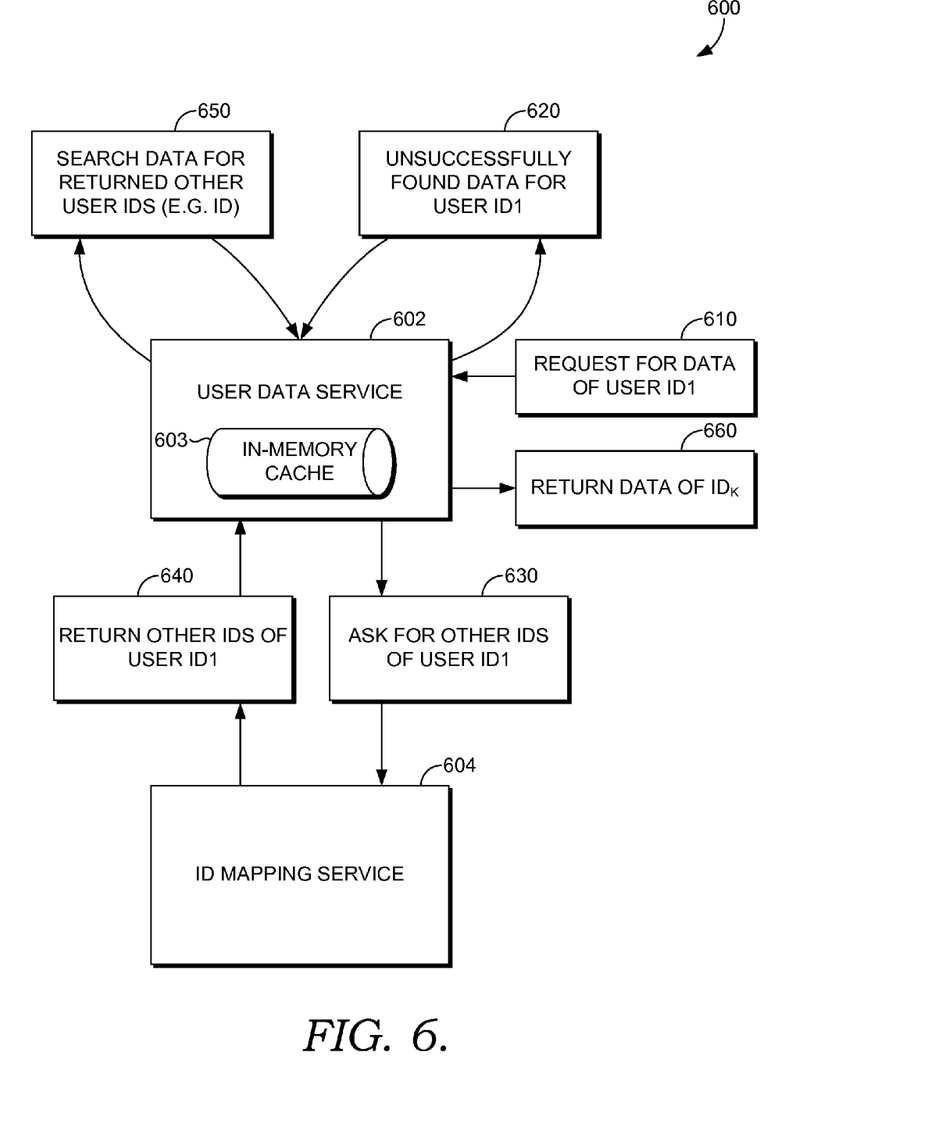
FIG. 6 is a flow diagram showing a method for returning requested data, in accordance with an embodiment of the present invention.

With reference to FIG. 6, an exemplary flow diagram is illustrated which shows a method 600 for maintaining a targetable user inventory for digital advertising, in accordance with an embodiment of the present invention. Initially, at block 610, a request is made by a data requestor for user data associated with User ID1. At block 620, data associated with User ID1 is not available in the in-cache memory 603. Subsequently, at block 630, the User Data Service 602 asks the User Identification Mapping Service 604 for other user identifications associated with User ID1. The User Identification Mapping Service returns, at block 640, other user identifications associated with User ID1. The in-cache memory, at block 650, returns user data associated with the other user identifications and this user data is associated with User ID1 and returned, at block 660, to the data requestor. If no other user identifications are associated with User ID1, then alternative identifications are sorted and selected, as described above in various embodiments, based on shared identification signals.

It will be understood by those of ordinary skill in the art that the order of steps shown in the method 300, 400, and 600 of FIGS. 3, 4, and 6 respectively are not meant to limit the scope of the present invention in any way and, in fact, the steps may occur in a variety of different sequences within embodiments hereof. Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer hardware storage media having computer-executable instructions embodied thereon, that when executed, cause a computing device to perform a method for maintaining a user inventory for digital advertising, the method comprising:

receiving a request for user data associated with a user identification, the user identification including identification signals;

determining that user data associated with the user identification is not available in an in-cache memory due to a loss or a purge of one or more cookies stored therein;

requesting from a user identification mapping service a list of alternative identifications corresponding to the user, each alternative identification including at least one identification signal in common with the identification signals of the user identification, the at least one identification signal stored in a user identification mapping store separate from the in-cache memory;

sorting the list of alternative identifications to identify a match to the user identification;

associating the match, identification signals associated with the match, and user data associated with the match with the user identification for which user data is not available in the in-cache memory; and communicating the user data associated with the match in response to an advertising call.

2. The media of claim 1 further comprising storing the identification signals associated with the match and the user data associated with the match with the user identification for which user data is not available in the in-cache memory.

3. The media of claim 1, wherein the identification signals comprise more than one of an internet protocol address, a browser type, a browser version, and user identifiable signals received from a web request.

4. The media of claim 1, wherein sorting the list of alternative identifications comprises ranking the list according to most recent access.

5. The media of claim 1, wherein sorting the list of alternative identifications comprises ranking the list according to a confidence factor.

6. The media of claim 1, wherein the list of alternative identifications comprises user identifications with at least one identification signal in common with identification signals associated with the user identification.

7. The media of claim 1, wherein the request comprises an advertising call.

8. The media of claim 1 further comprising assigning a new user identification for the user data associated with the match.

9. The media of claim 1 further comprising throttling requests to the user identification mapping service according to a desired impact on real-time performance.

10. A system, including one or more processors and one or more computer storage media, for maintaining a user inventory for digital advertising, the system comprising:

a behavior targeting component operable to receive information associated with a user identification, wherein the information includes user data;

an in-cache memory operable to communicate available user data based on cookies stored therein;

a user identification mapping store component operable to store stored data, wherein the stored data includes user identifications, user data, and identification signals; and a cache miss handling component operable to, when user data is not available in cache memory in association with a received user identification including received identification signals received with an advertising call, identify one or more alternative user identifications associated with one or more of the received identification signals by comparing the stored identification signals with the received identification signals associated with the received user identification, wherein the cache miss handling component associates an alternative user identification and associated identification signals with the received user identification and communicates stored user data associated with the alternative user identification in response to the advertising call.

11. The system of claim 10, wherein the identification signals comprise more than one of an internet protocol address, a browser type, a browser version, cookies, and user identifiable signals received from a web request.

12. A method for maintaining a user inventory for digital advertising, the method comprising:

receiving an advertising call for a user identification, the user identification including identification signals;

searching for the user identification in an in-cache computer memory;

determining the user identification is not available in the in-cache computer memory due to loss or purge of cookies stored therein;

requesting, from a user identification mapping store configured to store user identifications separate from the in-cache computer memory, alternative user identifications, each alternative identification including at least one identification signal in common with the identification signals of the user identification in the advertising call;

sorting the alternative user identifications to identify one of the alternative user identifications having the greatest degree of overlap with the identification signals of the user identification in the advertising call;

associating the one alternative identification and user data of the one alternative identification with the user identification; and communicating the user data associated with the one alternative identification in response to the advertising call.

13. The method of claim 12, further comprising transitioning information from the match to the user identification.

14. The method of claim 12, further comprising creating a new user identification.

15. The method of claim 12, further comprising transitioning user data from the user identification to a new user identification.

16. The method of claim 12, further comprising receiving more than one identification signal for the user identification.

17. The method of claim 16, wherein the more than one identification signal comprises more than one of an internet protocol address, a browser type, a browser version, cookies, and user identifiable signals received from a web request.

18. The method of claim 16, further comprising storing the more than one identification signal in a user identification mapping store.

19. The system of claim 10, wherein the behavior targeting component is further operable to search the in-cache memory for available user data.

20. The system of claim 10, wherein the operation of the cache miss handling component is governed according to an administrator-determined frequency.

21. The system of claim 10, wherein the user data include one or more targetable user behaviors.

* * * * *